Aug. 6, 1935.    J. L. CREVELING    2,010,140
LUBRICATING DEVICE
Original Filed Sept. 17, 1931    2 Sheets-Sheet 1

INVENTOR.
JOHN L. CREVELING
BY
ATTORNEY.

Aug. 6, 1935.    J. L. CREVELING    2,010,140
LUBRICATING DEVICE
Original Filed Sept. 17, 1931    2 Sheets-Sheet 2

INVENTOR
JOHN L. CREVELING
BY
ATTORNEY

Patented Aug. 6, 1935

2,010,140

UNITED STATES PATENT OFFICE 2,010,140

LUBRICATING DEVICE

John L. Creveling, Tucson, Ariz., assignor to The Lubrication Corporation, South Bend, Ind., a corporation of Delaware Application September 17, 1931, Serial No. 563,407
Renewed December 24, 1934

15 Claims. (Cl. 285—143)

This invention relates to lubricating devices and more particularly to devices for coupling a source of grease, or other lubricant supply to a fitting or nipple to be lubricated.

I have disclosed in a co-pending application, Serial No. 563,401 (Case #S. B. 2), a device of somewhat similar characteristics. The devices disclosed in this application in illustration of my present invention are in some respects, improvements over the device disclosed in said co-pending application and in other respects invoke a departure therefrom.

One of the objects of this invention is to provide a coupler capable of being securely attached to a fitting to be lubricated.

A further object is to provide a coupler capable of convenient attachment and/or lubricant feeding connection throughout a much greater range of angles than has heretofore been possible.

A further object of the invention is to provide a coupling device capable of being securely engaged in lubricant-tight relationship with a fitting to be lubricated regardless of the angle at which the coupler is attached or the position or direction from which the fitting is approached.

A further object of the invention is to provide a device of the character described in which the coupler is capable of being released from the fitting or nipple irrespective of pressure locks when attached to "frozen" fittings.

Further objects will be apparent after reading the subjoined specification and claims and after consideration of the accompanying drawings.

In order to explain the invention more clearly several embodiments thereof are shown in said drawings, in which.

In general, each of the devices illustrated herein comprises a tubular casing or coupling member provided with a tubular plunger or nozzle slidable therein and provided with means for supplying lubricant into the interior of the casing. The casing has secured at the end opposite to the grease supply a sleeve which in effect forms a part of the casing and forms a clamping member for the end of the casing. I have formed the clamping member with one or more recesses, each recess substantially conforming to the outer contour of the fitting to be lubricated. The plunger or nozzle also has a concave pocket for contacting with the opposite side of said fitting. A spring is positioned within the casing in such a position that it bears upon and tends to urge the plunger or nozzle outward toward the fitting thus aiding in clamping the fitting in the recesses provided therefor. Moreover, the inner end of the plunger is provided with devices which act as a piston whereby grease pressure serves to aid in clamping the plunger or nozzle against the face of the fitting to be lubricated. It is important to note that I have formed the face of the plunger or nozzle which is adapted to contact with the fittings so that it is inclined at an acute angle to the axis of the nozzle or plunger. I have in the preferred form illustrated provided lateral play between the plunger or nozzle and the casing in order to secure a clamping action which is more secure and more nearly perfectly lubricant-tight. I have provided means to back off the plunger to release the coupler from the fitting in case of pressure locks.

Figure 1:
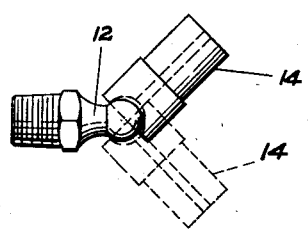
Figure 1 is a diagrammatic view showing the angular range through which a coupler having a plunger or nozzle with a perpendicular attaching face may be connected with a fitting to be lubricated.
Figure 2:
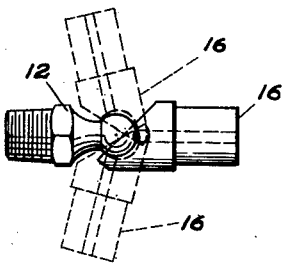
Figure 2 is a diagrammatic representation similar to Figure 1 showing the angular range through which a coupler having a plunger or nozzle provided with a 45 degree angle attaching face may be presented to and connected with a fitting to be lubricated.

Referring particularly to the drawings, there is shown in Figure 1 a fitting to be lubricated generally designated 12, and a coupler generally designated 14, adapted to lubricate the fitting. This coupler 14 is provided with a plunger or nozzle having a 90 degree or perpendicular face. In Figure 2, there is shown the fitting 12 associated with a coupler generally designated as 16. The coupler is provided with a plunger or nozzle having a 45 degree contacting face. The fittings 12 shown in the two figures are of exactly the same size and contact pockets or openings in the end of the two plungers in the two figures are of exactly the same size. From a consideration of the different relative positions of the coupler and fitting shown in full lines and in dotted lines in Figures 1 and 2 it may be clearly seen that the coupler provided with a plunger or nozzle having a 45 degree face may be attached to the fitting to be lubricated and will be adapted to supply grease thereto while contacting with the fitting at any angle throughout a range or zone bounded by lines drawn substantially 120 degrees from the center line or longitudinal axis of the fitting, whereas a fitting having a plunger or nozzle provided with a perpendicular face will be restricted to positions within a zone bounded by lines drawn substantially 45 degrees to the longitudinal axis of the fitting.

Figure 3:
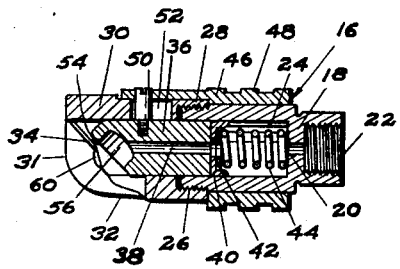
Figure 3 is a sectional view showing one form of improved coupler constructed according to my invention, the fitting to be lubricated being omitted for clearness.
Figure 4:
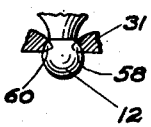
Figure 4 is a sectional view of a detail of the coupler shown in Figure 3 illustrating, somewhat diagrammatically, parts of the end of the clamping outer sleeve and the spherical pockets therein and by which the fitting is held.

The preferred form of coupler constructed according to my invention is shown in Figure 3 wherein there is disclosed a casing 18 formed with a longitudinal bore extending throughout. This bore is of relatively small cross section at 20 but is enlarged at the rearward end at 22 and is there formed with internal screw threads for attachment to a source of lubricant supply. It is also enlarged at the forward end to form a chamber 24 for purposes later to be described.

Means are provided for positioning the fitting to be lubricated in a socket associated with the casing 18. The forward end of the casing 18 is formed with external screw threads 26 onto which is screwed the rearward threaded extension 28 of a clamping sleeve 30. The sleeve 30 forms in effect a part of the casing 18 and provides a clamping member partially closing the forward end of the casing. For this purpose, the forward end 31 of the sleeve 30 is generally closed but is provided with a lateral opening 32 through which a fitting to be lubricated may be inserted and through which the neck of the fitting may, if desired, extend while the fitting is being lubricated. The forward end 31 of the sleeve 30 is also provided with a slot-like opening 34 at the end of the sleeve through which optionally the neck of the fitting may extend while the fitting is being lubricated.

Means are provided for resiliently clamping the ball head of the fitting 12 within the forward end of the sleeve 30. Partly within the enlarged bore or chamber 24 of the casing 18 and partly within the sleeve 30 is a plunger or nozzle 36 provided with a central bore 38 through which bore lubricant may pass toward the fitting to be lubricated. Rearward of the plunger 38 within the chamber 24 there is positioned a washer 40 of leather or other suitable material and contacting with said washer 40 is a metallic washer 42. Contacting with the washer 42 and extending rearward to abut against a portion of the casing 18 is a compression spring 44 which serves normally to urge the plunger 36 resiliently forward into contact with the fitting to be lubricated.

Means are provided for moving the plunger 36 back against the action of the spring 44 whenever such manual movement seems desirable. Surrounding a portion of the casing 18 and a portion of the sleeve 30 is an operating sleeve 46 formed with a knurled portion 48. The sleeve 46 has inserted therethrough a screw 50 which is threaded into a threaded opening in the plunger 36 and is adapted to slide in a slot 52 formed in the sleeve 30. Thus the operating sleeve may be used to retract the plunger 36 to allow the insertion of the ball head of the fitting 12. It may be used for the purpose of withdrawing the plunger 36 from contact with the ball head after the fitting has been lubricated. However, the ball head of the fitting may normally be inserted without manual operation of the plunger 36 by means of the sleeve 48, inasmuch as the insertion of the ball head will normally of itself force the plunger 36 back against the action of the spring 44.

I have provided a novel arrangement whereby it is possible to engage a fitting to be lubricated throughout a wide range of angle positions. It is to be especially noted that the face 54 of the plunger 36 is formed at a substantially 45 degree angle to the longitudinal axis of the plunger. Thus, as explained above in referring to Figures 1 and 2, the coupler is capable of operatively engaging the fitting to be lubricated throughout a much wider range of angles than would otherwise be possible. Moreover the ends of the sleeve 30 are so formed that contact of the neck of the fitting therewith prevents insertion of the fitting at angles other than those at which the pocket in the face 54 engages perfectly with the head of the fitting. It is to be noted that the ability to approach the fitting throughout at least 180 degrees (a hemisphere) is practically the ability to approach from any desired angle inasmuch as the remaining 180 degrees practically includes the bearing or other member to be lubricated to which the fitting is permanently attached.

Figures 10, 11:
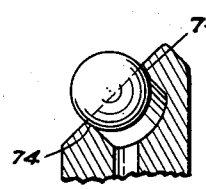
Figure 10 is an enlarged view of the end of the plunger or nozzle shown in Figure 3 showing more clearly the beveled edge of the pocket into which the fitting moves.
Figure 11 is a view similar to Figure 10 showing a modified form of beveled edge.
Figure 12:
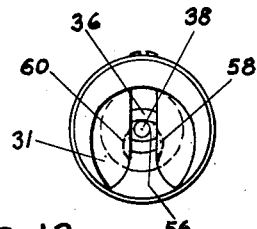
Figure 12 is an end view of the coupler shown in Figure 3.
Figure 13:
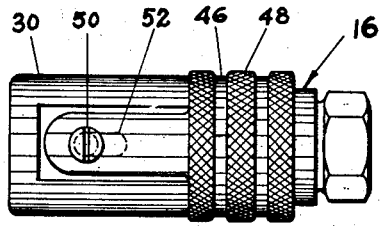
Figure 13 is a top plan view of the coupler shown in Figure 3.

The fitting may be clamped securely and in lubricant-tight relation in any of the positions illustrated in Figures 1 and 2. It is to be noted that the lubricant pressure is adapted to aid the spring in clamping the ball head of the fitting securely between the face 54 and the end 31. As the lubricant flows into the casing through the bores 22 and 20 and into the chamber 24, it builds up pressure in the chamber 24 which acts upon the rear end of the plunger 36 through the washers 40 and 42 and thus aids the spring 44 in urging the plunger 36 forward into contact with the ball head of the fitting 12 and after such contact in urging the plunger and the ball head of the fitting both forward so that the ball head is firmly clamped between the end 31 and the face 54. As suggested above, the various parts are formed so that this clamping of the ball head of the fitting 12 is substantially lubricant-tight, while at the same time provision is made for supplying lubricant to the fitting while the face of the plunger is in contact therewith throughout a wide range of angles. A pocket 56 formed in the elliptical face 54 of the plunger 36 has a circular outline which is adapted to cover a zone of the ball-shaped head of the fitting to be lubricated, said zone extending throughout substantially one-half of the surface of said head. As the plunger 36 moves into contact with the ball head of the fitting 12, it forces the ball head toward the end 31 and into a pair of concave pockets 58 and 60 which are formed in the end of the clamping sleeve 30, the plunger 36 being urged by the spring 44, by the lubricant pressure in the chamber 24, or by a combination of these forces. The pockets 58 and 60 are formed throughout to fit exactly a portion of a sphere, the curvature of both corresponding to that of a single sphere having a radius equal to the radius of the ball head of the fitting to be lubricated. Moreover, in order to form a more perfect lubricant-tight fitting, the edges 74 of the lubricant pocket 56 are beveled (as shown more clearly in the enlarged view of Figure 10) so that the ball head of the fitting contacts with the plunger on a relatively wide surface in order to insure a more perfect grease-tight joint than would be possible through a single line contact. The edge 74 is shaped for a short distance to have a complementary contour with the surface of the ball head of the fitting. Thus the edge 74 of the pocket 56 is formed with a concave surface, the curvature thereof (like the curvature of the pockets 58 and 60) having a radius equal to the radius of the ball head of the fitting 12 and the center of the curvature of the edge 74 coinciding with the center of the curvature of the pockets 58 and 60. In Figure 11, the edge 74 is shown beveled flat. Such a bevel is much easier and much less expensive to machine and is satisfactory to give a wider bearing surface and a perfect grease lubricant joint for all practical purposes. Moreover as the edges of the pocket wear, the ball head sinks deeper and maintains the lubricant tight joint in spite of the wear. This construction is therefore especially important in a coupler having an angle face and having a contact almost as great as the diameter of the ball head.

Figure 6:
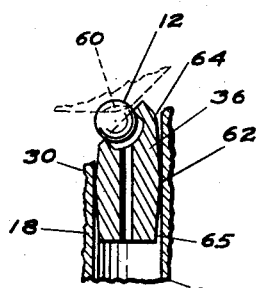
Figure 6 is a sectional view of part of the coupler showing to an exaggerated degree the double conical shape of the nozzle or plunger used in the coupler shown in Figure 3.
Figure 8:
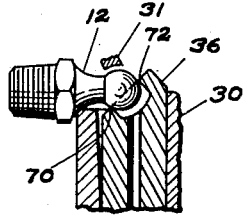
Figure 8 is a diagrammatic view illustrating one stage in the process of introducing the fitting into the coupler.

In the process of moving the surface 74 or 74a into contact with the ball head of the fitting and moving the ball head of the fitting into the pockets 58 and 60, it would be difficult, if not impossible, to secure a perfectly lubricant-tight joint were the plunger 36 moved always directly toward the ball head of the fitting 12. I have discovered that it is very advantageous, if not absolutely necessary, in order to secure a greasetight joint, that there be some lateral movement f the plunger 36 relative to the ball head of the fitting. Referring to Figure 8 it may be seen that if the plunger 36 were moved longitudinally of its axis and if the ball head of the fitting 12 were restrained against lateral movement by its seat in the end 31, the side 72 would never come into close contact with the ball head of the fitting. In Figure 6 I have illustrated in an exaggerated manner the shape of the plunger 36. It may be noted that the plunger 36 is formed with double conical sides. That is to say, the diameter of the plunger 36 is greatest at 62 and gradually becomes smaller towards the ends 64 and 65. By reason of the described shape of the plunger and the fact that the casing 18 including the sleeve 30 has substantially parallel sides a relative side play is provided between the plunger and the casing.

Figure 5:
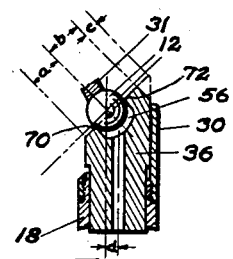
Figure 5 is a sectional view of parts of the coupler shown in Figure 3 illustrating the position of the contact face of the plunger sleeve or nozzle by which the fitting is held within the coupler relative to the center line of the plunger.

It is to be noted that the pocket 56 is not positioned (as shown clearly in Fig. 5) in the position which would be the center of the end surface of the plunger were the plunger merely cut off at a 45 degree angle. It may be noted that in Fig. 5 the distance $a$ equals the distance $b$ and therefore the center of the pocket is offset from the position which would normally be the center of the face by a distance that is equal to one-half cf $c$. Lubricant pressure acting on the plunger 36 normally acts along the line $d$ (upward as shown in Fig. 5). And inasmuch as the line $d$ passes to one side (the right as shown in Fig. 5) of the center of the pocket 56 there is a turning moment (counter-clockwise as shown in Fig. 5) on the plunger 36 to force the point 72 into contact with the ball head of the fitting and moreover inasmuch as the point 78 contacts with the ball head of the fitting to the left as shown in Fig. 5 of the center of the ball head, this causes a movement of the plunger 36 to the left relative to the ball head of the fitting 12 so that the surface 74 comes into perfect grease-tight contact with the ball head of the fitting. At the same time, of course, the ball head is clamped firmly in the pockets 58 and 60. In Figs. 3 and 8 the end 31 is shown for the sake of clearness as if it were a single central member instead of a pair of spaced members.

Figure 7:
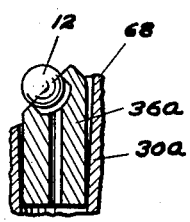
Figure 7 is a view similar to Figure 6 showing a different shape of plunger and clamping sleeve which may be used after the manner of the device shown in Figure 3.

In Fig. 7 there is illustrated an alternative method by which similar relative side play between the plunger and the casing may be obtained. Therein the plunger 36a is formed with substantially straight sides but the sleeve 30a is formed so as to have a gradually increasing diameter as it approaches the outer end 58 of the coupler. It is clear that if desired a double conical casing might be provided in combination with a plunger having substantially straight sides, or a straight sided casing might be provided in combination with a plunger having a gradually decreasing diameter throughout in one direction, and in such cases the same result could be obtained and such alternatives should also be considered within the scope of my invention.

Figure 9:
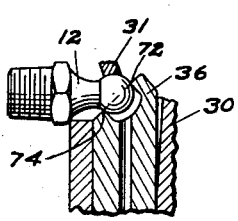
Figure 9 is a diagrammatic view similar to Figure 8 illustrating a further stage in the insertion of the fitting into the coupler.

It is believed that the operation of the coupler above described in illustration of my invention will be clear from the above description. The coupler 16 may be moved to the fitting 12 so that the ball head of the fitting is in effect inserted in the outer end of the casing 18 as extended by the sleeve 30, through the lateral opening 32 thus forcing the plunger 36 rearward against the spring 44. Thereafter, the plunger 36 will be moved forward resiliently by the spring 44 to urge the ball head of the fitting 12 into the pockets 58 and 60. The ball head of the fitting having moved into the pockets 58 and 60 is substantially fixed against further movement and as the spring continues to move the plunger outward, the plunger moves first to the right as shown in Figure 8 to allow the edge to clear the ball head of the fitting and then to the left as shown in Figure 9 so that the surface 74 throughout its circumference contacts tightly with the ball head. Thereafter the operator forces lubricant through the bores 22 and 18, the chamber 24, the bore 38, and the lubricant pocket 56 into the fitting to be lubricated. The pressure of lubricant in the pocket 24 aids the spring 44 in securely holding the plunger 36 in contact with the ball head of the fitting and in this connection it is to be noted that the area of washers 40 and 42 is greater than the area of the surface of the ball circumscribed by the lubricant pocket 56. Thus the lubricant pressure holding the plunger in contact with the ball head of the fitting is greater than the lubricant pressure in the pocket tending to separate the plunger from the fitting. The end of the coupler in moving to cause the ball head of the fitting to enter the clamping end of the casing must move laterally toward the fitting so that the fitting passes through the opening 32, but in making this movement the coupler may be positioned with its longitudinal axis and with the longitudinal axis of the plunger 36 in any angular position with respect to the longitudinal axis of the fitting throughout substantially a zone formed by lines at angles of 120 degrees to the longitudinal axis of the fitting.

Figure 14:
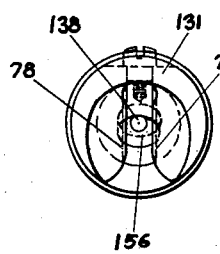
Figure 14 is an end view of a different form of coupler.
Figure 15:
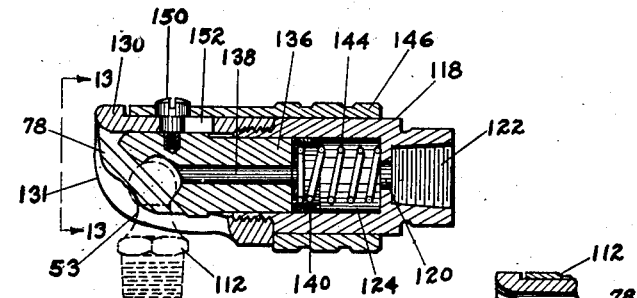
Figure 15 is a sectional view of the coupler shown in Figure 13.
Figure 16:
Figure 16 is a fragmentary detail of the coupler shown in Figure 15 illustrating one of the grooves in which the fitting is adapted to move.

In Figures 14, 15 and 16, I have illustrated a modified form of coupler also constructed according to my invention. Therein similar features correspond to the respective features shown in Figure 3 as follows:—The casing 118 to the casing 18; the bore 122 to the bore 22; the bore 120 to the bore 20; the chamber 124 to the chamber 24; the spring 144 to the spring 44; the sleeve 146 to the sleeve 46; the washer 140 to the washer 40; the bore 138 to the bore 38; the screw 150 to the screw 50; the slot 152 to the slot 52; the fitting 112 to the fitting 12; and the sleeve 130 corresponds to the sleeve 30. In this modified form, however, instead of the pockets 58 and 60 I provide a pair of grooves 76 and 78 formed in the end 134 of the sleeve 130. These grooves are parallel to the inclined face of the plunger 136 and their curvature in planes normal to the length of the grooves corresponds to the curvature of the ball head of the fitting 112. It is to be noted that the plunger 136 is formed to fit relatively tightly in the casing 118 and sleeve 130 so that no side play is allowed.

In the operation of clamping the ball head in the end of the casing of the form shown in Figure 15, the plunger in moving outward forces the ball head of the fitting along its grooves 76 and 78, the relative movement between the plunger and the ball head being accomplished by movement of the ball head relative to the casing 118 rather than movement of the plunger 136 relative to said casing.

Figure 17:
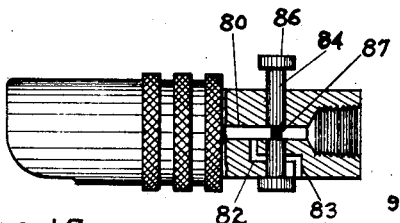
Figure 17 is a view in side elevation with parts broken away illustrating a coupler of the character shown in Figure 3, or of the character shown in Figure 14, provided with a device for releasing the coupler from a fitting should the coupler otherwise be difficult to release due to a pressure lock.

In Figure 17 I have shown a modified form of coupler constructed generally similarly to the device shown in Figure 3, but provided with a device by which pressure may be relieved in the chamber corresponding to the chamber 24, should the coupler become pressure locked by reason of the supply of excessive pressure which might be necessary to lubricate a "frozen" fitting. In Figure 17 I have made the bore 80 which corresponds generally to the bore 20 of Figure 3, but is of greater length. I have provided bypass passages 82 and 83 through which the lubricant may, when desired, escape from the chamber corresponding to the chamber 24. I provide a valve member 84 which normally prevents the passage of lubricant from the bypass 82 to the bypass 83. However, the operator may, by pushing down the handle 86 align the reduced portion 87 of the valve member 84 with the bypasses 82 and 83 to allow communication between the passages 82 and 83. At the same time he closes the passage through the bore 80 and thus relieves the pressure in the chamber.

Figure 18:
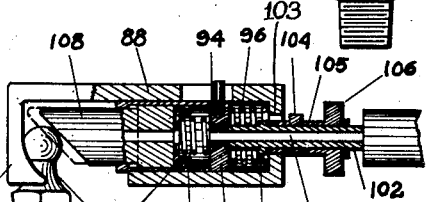
Figure 18 is a view in longitudinal section showing a modified form of coupler equipped with a pressure lock releasing arrangement different from that pressure lock releasing arrangement illustrated in Figure 17.

In Fig. 18 I have disclosed a device designed to accomplish a similar purpose. Therein I have shown casing 88 having its forward end 90 formed with pockets for the reception of the fitting 92. The forward end 90 is shown as a conventional claw, but it is to be understood that I prefer to use an improved clamping end such as one similar to those shown in Figs. 3 or 15. Within the casing 88 there is slidably mounted sleeve 94 normally urged forward in the casing by a spring 96. The casing 94 is formed with an opening 98 communicating with a bore 100 formed in the lubricant supply pipe 102. Within the sleeve 94 there is mounted a plunger 108, a washer 110 and a spring 112 corresponding in function and design to the plunger 36, the washer 40, and the spring 44 shown in Fig. 3. A lug 104 placed on a sleeve 105 mounted for rotation between rings secured to the pipe 102 is designed to be moved normally forward by the spring 96 to a position within the casing 88. There, rotation of the sleeve 105 causes the lug 104 to turn within the casing and catch against the rear end of the casing. For the purpose of providing easy rotation of the pipe and manipulation of this catch device, a handle 106 is secured to sleeve 105. In order to release the coupler in case of an hydraulic lock, the sleeve 105 is rotated until the lug 104 is in register with the slot 103, whereupon it may be pulled back thereby expanding the pressure chamber within the sleeve 94 and relieving the pressure tending to lock the coupler and fitting together.

Figures 19, 21:
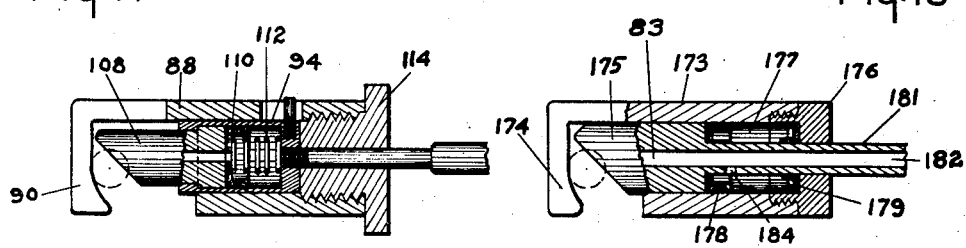
Figure 19 is a view similar to that of Figure 18 showing a still different form of device for relieving pressure locks.
Figure 21 is a view in section of a still different form of coupler.

Fig. 19 discloses a device somewhat similar to that shown in Fig. 18. Therein similar parts are designated by like reference numerals and only dissimilar parts are described in detail. Instead of the latching device formed by the elements 102 and the rear end of the casing 88, I have formed the rear end of the casing with a screw plug 114 which bears upon the sleeve 94 and is adapted to be screwed into the casing 88. This plug corresponds in functional purpose to the latch device shown in Fig. 18.

It is believed that the operation of the modified forms of my improved coupler will be apparent from the above description. Should the coupler become pressure locked by reason of excessive pressure being supplied to lubricate a "frozen" fitting, the pressure may be relieved in the case of the device shown in Fig. 17 by operating the valve 86. It can be relieved in the device shown in Fig. 18 by turning the handle 106 and releasing the lugs 104 from their contact with the casing 88. In the case of the device shown in Fig. 19, the pressure may be relieved by unscrewing the nut 114 and thus allowing the sleeve 116 and its co-operating plunger to be backed away from the fitting.

Figure 20:
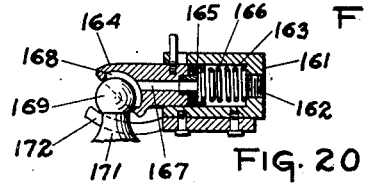
Figure 20 is a view in section of a different form of coupler.

The coupler shown in Fig. 20 comprises a cylindrical casing 161 having a threaded opening 162 for the insertion of a conduit leading from a source of lubricant supply, and having a chamber 163 within which is telescoped a tubular plunger 164 having associated therewith a piston or washer 165 and a spring 166. The plunger is formed with a bore 167 leading to a lubricant pocket 168 from which lubricant is supplied to the ball head 169 of the fitting 171. Secured to the lower side of the casing 161 is a finger or claw member 172 against which the ball head of the fitting is clamped by the plunger.

It is believed that the operation of the modified form of my improved coupler will be apparent from the above description. Instead of the ball head being forced into the pockets or along the grooves, it is forced against the claw member 172 and is held tightly clamped between said claw member 172 and the plunger. The structure thus does not have all of the advantages of the preferred form previously described, but is simpler in design and construction.

In Fig. 21 there is shown a coupler having a casing 173, a clamping end therefor illustrated as a conventional claw 174, and a plunger 175 slidably mounted in the casing 173. The rear end of the casing 173 is closed by a plug 176 and between the front end of the plug 176 and the rear end of the plunger 175 there is formed a pressure chamber 177. The front and rear ends of this chamber are sealed by annular washers 178 and 179 which surround a conduit 181 which forms a rearward extension of the plunger 175. The bore 182 of the conduit 181 is aligned with a bore 183 formed in the plunger 175 and lubricant passes directly from the conduit through the plunger to the fitting to be lubricated. The conduit 181 is formed with an opening 184 through which lubricant may pass to the chamber 177.

The operator in inserting the coupler on the fitting may, by force exerted on the conduit 181 relatively opposite in direction to force applied to the casing and clamp 173, move the plunger 175 to clamping relationship with the clamping member 174. Thereafter turning on the lubricant supply forces lubricant under pressure into the chamber 177 to maintain the coupler clamped to the fitting.

It is to be understood that the above described embodiments of the invention are for the purpose of illustration only; and various changes may be made therein without departing from the spirit and scope of the invention.

I claim:

1. A coupler for servicing a fitting to be lubricated comprising a casing, means for supplying lubricant to said casing, and means for clamping the fitting to the casing including a lubricant pressure operated plunger, said plunger having a clamping face substantially in a plane inclined at an angle other than a right angle to the axis of the plunger.

2. In a lubricating device, a coupler for servicing a ball headed lubrication fitting comprising a casing, means for clamping the ball head of the fitting in the casing comprising a plunger slidably mounted in said casing, a piston associated with said plunger, and means for supplying lubricant to said casing adjacent to said piston for forcing one face of said plunger into contact with a side of said ball head, the face of said plunger contacting with said ball head being substantially in a plane acute to the direction of lubricant pressure.

3. In a lubricating device, a coupler for servicing a ball headed lubrication fitting, comprising a casing, means for supplying lubricant to said casing, a pocket for the ball head of said fitting associated with said casing, a plunger in said casing, a spring for urging said plunger into contact with the ball head of the fitting for clamping said ball head within the casing, the face of the plunger which is urged into contact with the ball head of the fitting lying substantially in a plane acute to the direction of action of the spring.

4. A lubricating device comprising a fitting to be lubricated having a substantially spherical head, a casing, means for supplying grease to said casing, a plunger movable in said casing, means including said plunger for clamping said fitting in said casing by means of the contact of one face of the plunger with the fitting, said contact comprising an annular surface having its axis of generation forming an obtuse angle with the axis of the plunger.

5. In a lubricating device, a coupler for servicing a lubrication fitting having a substantially spherical head comprising a cylinder, and a piston in said cylinder, said piston having a tubular thrust extension adapted to contact the spherical head, said extension having an annular area adapted to contact with said fitting, and said area lying substantially in a plane forming an acute angle with the extension, and having a diameter less than the diameter of the spherical fitting.

6. In a lubricating device, a coupler for servicing a lubrication fitting having a ball head, comprising a casing, fitting engaging means associated with said casing, and a nozzle slidably mounted in said casing, said nozzle having a flat fitting contact face inclined at an angle other than a right angle to the axis of said nozzle.

7. In a lubricating device, a coupler for servicing a ball headed fitting to be lubricated, comprising a casing, a plunger slidably mounted in said casing having a flat fitting contact face inclined at an angle other than ninety degrees to the longitudinal axis of said plunger, and means for partially closing one end of said casing, said end closure having indentations of which at least one outline is circular.

8. In a lubricating device, a coupler for servicing a ball headed lubricant receiving fitting comprising a casing, a pair of spaced apart fitting engaging jaws associated with said casing, each of said jaws being formed with a pocket having spherical walls generated about a radius equal to the radius of the ball head of said fitting, a plunger slidably located within the casing and providing a discharge orifice circumscribed by a fitting engaging contact surface defining the zone of a sphere generated about a radius equal to the radius of the ball head of said fitting and means for admitting lubricant under pressure into the casing to cause the plunger to move toward said clamping jaws whereby the said plunger contact surface and the said jaws may intimately contact with opposed surfaces of said fitting head.

9. In a lubricating device, a coupler for servicing a fitting to be lubricated comprising a tubular casing, a plunger slidably mounted in said casing having a face adapted to contact with said fitting, said face being inclined with respect to the axis of the plunger at other than a right angle, means for partially closing one end of said casing, said means being formed with a groove parallel to the face of the plunger.

10. In a lubricating device, a coupler for servicing a lubrication fitting comprising a casing, fitting engaging means associated with said casing, a plunger in said casing, lubricant pressure operated means operative to move said plunger to clamp the head of the fitting within the casing, the adjacent side walls of said plunger and said casing being slightly inclined with respect to one another whereby relative tilting movement is allowed between said plunger and said casing.

11. In a lubricating device, a coupler for servicing a ball headed lubrication fitting comprising a tubular casing formed with an end closure, said end closure having a pocket therein for fixedly retaining the ball head of the fitting to be lubricated, means for urging said plunger into contact with the ball head for clamping said ball head in said casing, the adjacent side walls of said plunger and said casing being slightly inclined with respect to one another whereby relative tilting movement is allowed between said casing and said plunger and between said ball head and said plunger to secure a tight fit between said plunger and said ball head.

12. In a lubricating device, a coupler for servicing a lubrication fitting comprising a casing, having cylindrical inner side walls, fitting engaging means associated with said casing and a plunger engageable with said fitting positioned in said casing having substantially conical sides.

13. In a lubricating device, a coupler for servicing a lubrication fitting having a ball head comprising a tubular casing, fitting engaging means associated with said casing, and a cylindrical wall plunger engageable with said fitting slidably mounted in said casing, said tubular casing having conically shaped sides throughout at least a portion of its length.

14. In a lubricating device, a coupler for servicing a lubrication fitting formed with a ball head comprising a casing, fitting engaging means associated with said casing, a plunger slidably mounted in said casing, said plunger having a face adapted to contact with the ball head of said fitting and having a pocket formed in said face, the intersection of the center line of said pocket with the plane of the face being offset from the longitudinal center line of the plunger.

15. In a lubricating device, a nozzle for servicing a ball head lubrication fitting having a flat fitting engaging contact face inclined to the axis of the nozzle at an angle other than ninety degrees, said contact face having a non yielding contact surface substantially equal to the diameter of the ball head and having a lubricant pocket enclosed by said surface, the sides of said pocket being tapered inwardly so that after wear of ball head and the nozzle the head seats deeper in the pocket and maintains a lubricant tight seal.

JOHN L. CREVELING.